Patented June 20, 1939

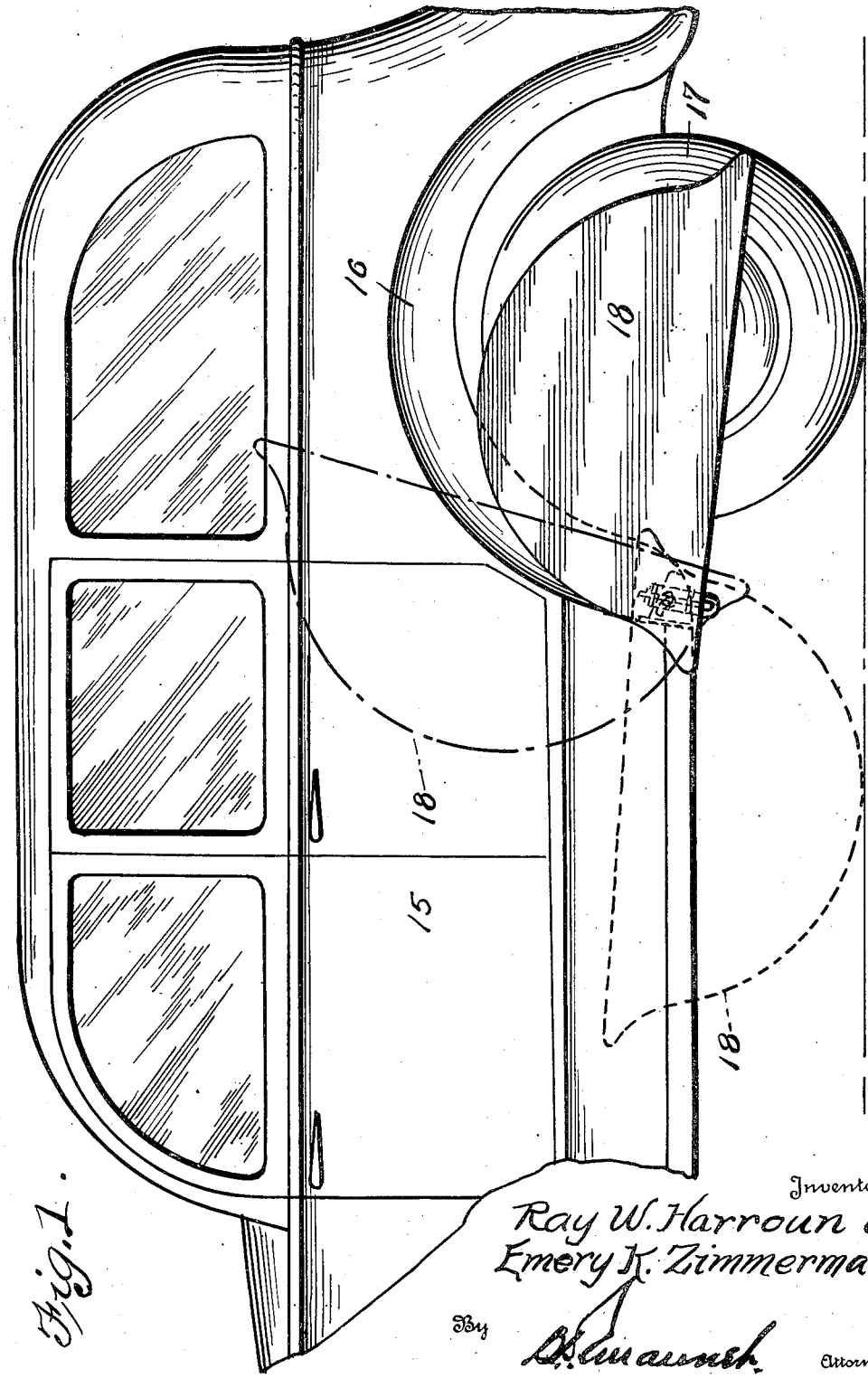

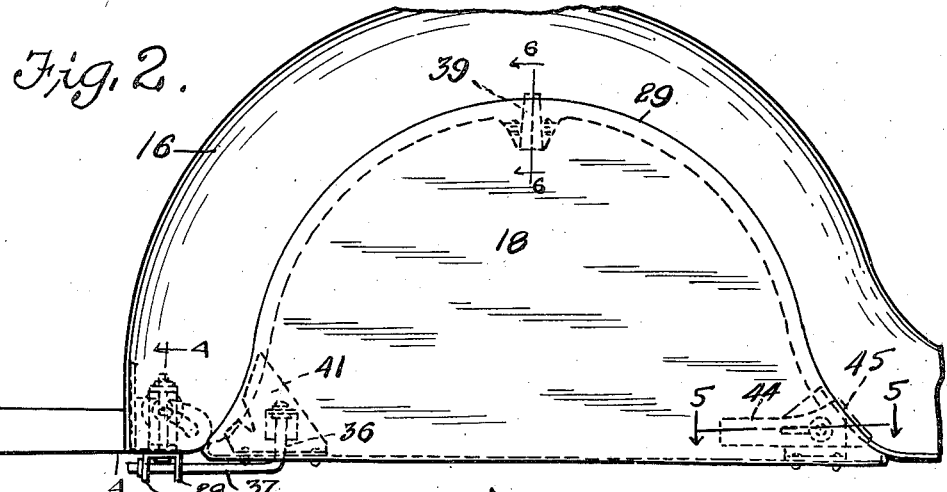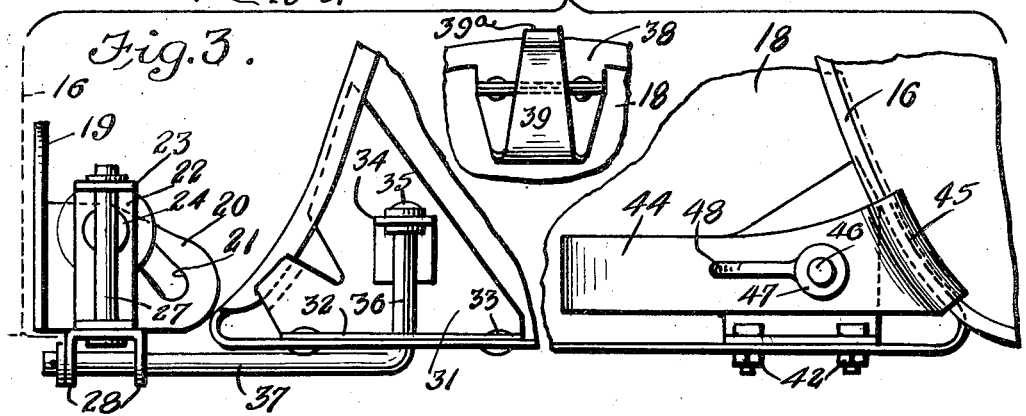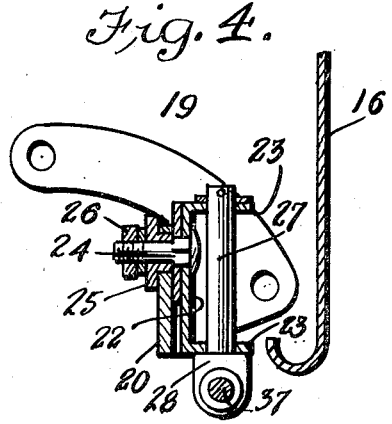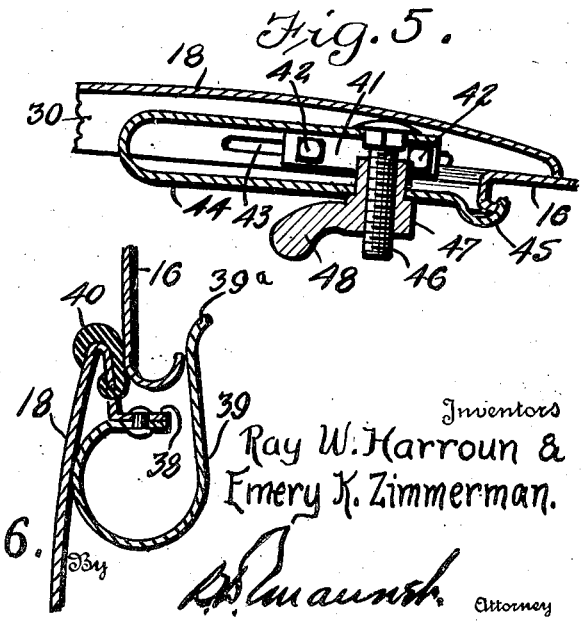

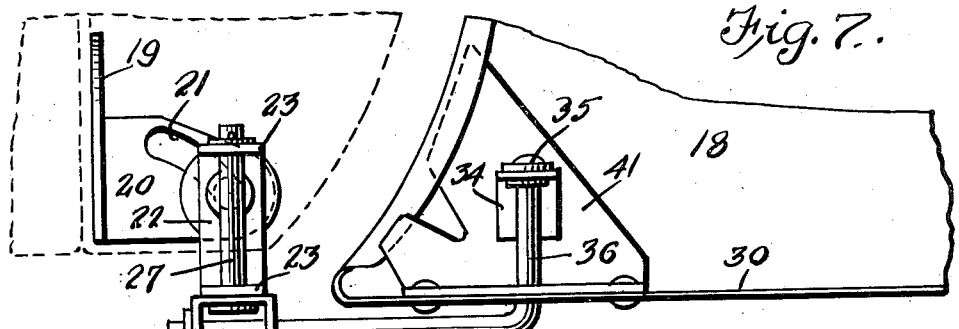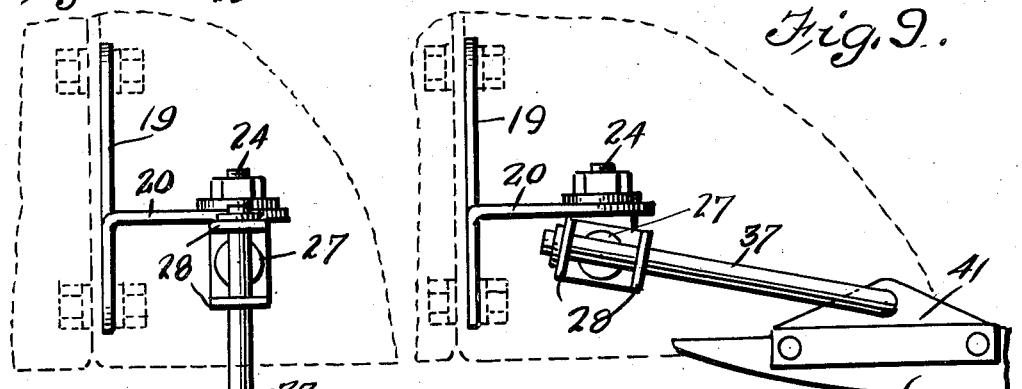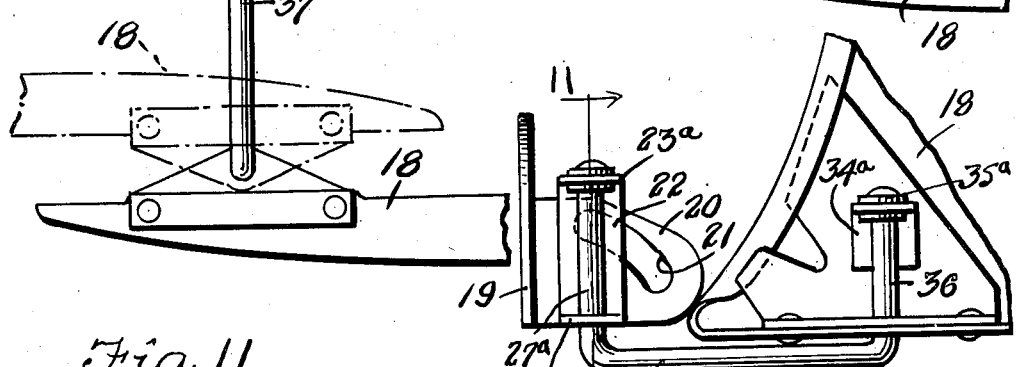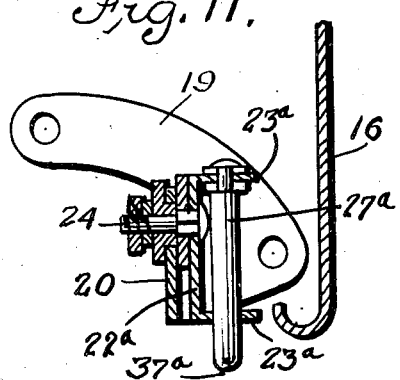

2,163,321

UNITED STATES PATENT OFFICE 2,163,321

WHEEL GUARD

Ray W. Harroun, Saginaw, and Emery K. Zimmerman, Detroit, Mich., assignors to Aero-Style Corporation, Indianapolis, Ind., a corporation of Indiana Application February 6, 1935, Serial No. 5,315
Renewed May 9, 1939

4 Claims. (Cl. 280—153)

This invention relates to certain new and useful improvements in wheel guards.

The wheel guard disclosed herein is of the general type shown in application for patent filed by Ray W. Harroun on May 15, 1934, Serial No. 725,783 and Emory K. Zimmerman, filed on May 15, 1934, Serial No. 725,789 and embodies improved features in construction and operation over the disclosures in said applications.

The primary object of this invention is to provide a wheel guard for association with a mud guard or fender of an automobile wheel for closing the side opening in the fender and being in the form of a wall or plate that is substantially semi-circular in side elevation with the curved edge thereof juxtaposed to the lower curved edge of a fender and having the lower straight edge thereof lying in the plane slightly below the axle or wheel hub for overlying the upper portion of the wheel.

A further important object of the invention is to improve the mounting for the wheel guard by providing a swivel or universal element permitting the wheel guard wall or plate to swing in a vertical plane parallel to and adjacent the fender and running board of the automobile whereby the wheel guard may be displaced relative to the fender opening and wheel to permit access to the latter should the wheel be disclosed adjacent the street curbing, garage or other wall.

It is a still further object of the invention to provide a novel mounting for a wheel guard of the foregoing character that swings to open position in a vertical path as described and is also capable of swinging movement in horizontal planes for exposing the wheel for access.

The invention further embodies novel devices for retaining the wheel guard in snug engagement with the wheel fender.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a fragmentary side elevational view of an automobile with the rear fender gripped with the wheel guard of this invention and illustrated in its partially opened position and further illustrated by dot and dot and dash lines as movable in a vertical plane parallel to and adjacent the wheel fender and running board of the automobile for exposing the tire and wheel;

Figure 2 is a fragmentary side elevational view showing a wheel fender with the wheel guard engaged therewith;

Figure 3 fragmentarily illustrates inner side view of the guard wall, the universal mounting therefor, a fender engaging clip carried thereby and the resilient locking clip for retaining the guard wall in position;

Figure 4 is a detail sectional view taken on line 4—4 of Figure 2 showing the swivel or universal mounting for the guard wall;

Figure 5 is a detail sectional view taken on line 5—5 of Figure 2, showing the resilient locking clip for anchoring the upper edge of the guard wall to the fender;

Figure 6 is a detail sectional view taken on line 6—6 of Figure 2, showing the spring clip connection between the guard wall and fender;

Figure 7 is a fragmentary elevational view of the inner side of the guard wall with the latter shifted to its initial opening position disengaging the guard wall from the fender;

Figure 8 is a fragmentary bottom plan view of the swivel or universal connection showing the connection and guard wall in its second stage of movement with the guard wall illustrated by dotted lines as swung in a horizontal plane to expose the wheel;

Figure 9 is a fragmentary bottom plan view showing the position assumed by the swivel or universal connection and the guard wall when the latter is in its closed position relative to the fender opening;

Figure 10 is a fragmentary inner face view showing a modified form of swivel mounting and with which the guard wall swings in a horizontal plane to open position; and Figure 11 is a vertical sectional view taken on line 11—11 of Figure 10.

As shown in Figures 1 and 2, the automobile 15 includes a rear wheel fender 16 of ordinary construction overlying the rear wheel 17 and having the usual side opening therein that is adapted to be closed by the guard wall 18 of substantially semi-circular formation in side elevation. The lower forward edge of the guard wall 18 has a translatable universal connection with the lower forward end of the fender 16 and means are carried by the upper and lower rear edges of the guard wall for detachable engagement with the fender for holding the guard wall anchored in position and in snug non-vibratory engagement with the fender. The translatable and universal connection between the guard wall and fender permits the guard wall to be displaced laterally of the fender into a plane parallel with and adjacent the fender and running board of the automobile for subsequent movement for uncovering the fender opening and exposing the wheel in the vertical plane parallel with the wheel fender and running board or in a horizontal plane.

The mounting for the guard wall comprises an annular bracket having a base plate 19 anchored to the inner face of the lower forward edge of the fender 16 with a bracket arm 20 projecting at right angles therefrom toward the rear of the fender, there being a downwardly directed arcuate slot 21 in the bracket arm 20. The mounting further includes a yoke of U-form comprising a base plate 22 having angle ends 23, the yoke being pivotally mounted on the bracket arm 20 by means of the headed bolt 24 passing through the base plate 22 of the yoke through the arcuate slot 21 in the bracket arm for seating in the bearing collar 25 mounted on the bolt and extending into the arcuate slot with the bearing collar retained in position by the nut 26 threaded on the end of the bolt 24, suitable washers or spacers being associated with this assembly to facilitate pivotal movement of the yoke on the bracket arm. A pin 27 is journalled in the angle ends 23 of the yoke, the upper end of the pin above the upper angle end 23 receiving a cotter pin or the like for retaining the same in position, while the lower projecting end of the pin 27 below the lower angle end 23 supports the yoke comprising a pair of spaced ears 28 that forms a direct support for the guard wall 18 of the wheel guard.

The guard wall 18 is of substantially semi-circular formation and has an upper curved edge 29 coincident to the curvature of the lower edge of the fender 16 and said guard wall 18 has a base flange 30. The mounting plate 31 is flatly engaged with the inner face of the guard wall 18 at the lower forward portion thereof and has an angle flange 32 at its lower end for engagement with the base flange 30 of the guard wall to be anchored thereto as at 33. An angle bracket 34 is carried by the mounting plate 31 and swivelly supports as at 35 the upper end of the arm 36 projecting at right angles from one end of the rod 37 while the other end of the rod is rotatable in the ears 28 of the yoke at the lower end of the pin 27.

As shown in Figures 2, 3 and 6, spring clips are carried by the guard wall 18 for engaging with the wheel fender 16 for holding the guard wall in snug engagement with the fender and against vibratory or ratchet movement. A finger extension 38 is carried by the upper edge of the guard wall 18 and to which a looped spring clip 39 is anchored at the inner side of the guard wall, the free end 39a of the spring clip being engaged with the inner side of the lower rolled edge of the fender 16 while a gasket or pad 40 is anchored to the upper end of the guard wall and the finger extension 38 engages the outer side of the fender 16 for cooperation with the spring clip 39 to effect the snug engagement between the guard wall and fender, the pad 40 also preventing the marring of the fender. It is to be understood that any number of these spring clips 39 may be employed for accomplishing the purpose.

The guard wall is adapted to be locked in its closed position relative to the fender opening and wheel and as shown in Figures 2, 3 and 5, a bracket plate 41 is adjustably anchored to the base flange 30 of the guard wall adjacent the rear lower corner thereof by means of anchor bolts 42 passing through the bracket 41 and slotted openings 43 in the base flange 30, the bracket 41 carrying a U-shaped resilient element comprising a resilient arm 44 having a curved grooved end 45 for engagement with the rolled edge of the fender 16. The inherent resiliency of the arm 44 is such as to cause the free end 45 thereof to move away from the opposite arm of the U-shaped element and wheel fender 16, and to effect movement of the arm 44 toward the fender edge for engagement therewith, the bracket plate 41 carries a screw bolt 46 extending through an opening in the arm 44 for the reception of a nut 47 threaded thereon and operated by a handle 48. The nut 47 comes into engagement with the arm 44 to force the end 45 thereof to engage the edge of the wheel fender.

The wheel guard 18 is illustrated in Figure 2 in its fully closed position relative to the opening in the fender 16 and covers the upper side of the automobile wheel 17. The initial position assumed by the guard wall 18 during opening movement thereof is illustrated in Figures 1 and 7. The resilient arm 44 is disengaged from the fender 16 and the guard wall 18 is moved downwardly relative to the fender 16 with the bolt or screw support 24 for the yoke moved downwardly in the arcuate slot 21 in the bracket arm 20, the guard wall 18 then being bodily sifted laterally of the fender 16 to occupy a position in a plane parallel with an adjacent fender and running board of the automobile. When in this position as further illustrated in Figure 8, the guard wall may be swung in two directions laterally of the fender opening to expose the wheel, either in a vertical plane parallel with the wheel fender 16 as illustrated by dot and dash lines in Fig. 1 or in the horizontal plane as illustrated by dot and dash lines in Figure 8. When the wheel guard moves in a vertical plane, the base plate 22 of the yoke, that forms a part of the universal mounting, pivots on the screw 24. Should the automobile be parked in proximity of a street clurbing or close to the wall of a garage or other building, it is desirable to swing the guard wall through the vertical plane and when there is sufficient space for free movement of the guard wall, the latter can be shifted by movement in a horizontal plane as illustrated in Figure 8.

In Figures 10 and 11 of the drawings, the lower yoke member comprising the ears 28 on the lower end of the pin 27 is eliminated and the rod 37a has one angle end 36a swivelly connected as at 35a to the bracket 34a carried by the wheel guard 18 while the other angle end 27a of the rod 37a is rotatably supported in the angle ends 23a of the base plate 22 of the yoke. In this form of the invention, the guard wall 18 moves only in a horizontal plane during opening and closing movement thereof relative to the fender opening.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

What is claimed is:

1. In the combination of a wheel guard and a vehicle fender of the type whereby the guard is movably fastened to the fender, means for movably fastening the wheel guard to the fender comprising a slotted fender bracket, an angle plate slidably mounted in the slot of said bracket and an L-rod pivotally mounted at one end to said angle plate and at the other end to a wheel guard.

2. In the combination of a wheel guard and a vehicle fender of the type whereby the guard is movably fastened to the fender, means for movably fastening the wheel guard to the fender comprising a slotted fender bracket adapted to be placed at a lower corner of the fender opening, said slot extending downward and toward the fender opening, an angle iron bolted to slide in said slot and having an outwardly extending projection, a member pivotally bolted to said outwardly extending projection, and an L-rod pivotally mounted at one end to said member and at the other end to a fender guard.

3. In the combination of a wheel guard and a vehicle fender of the type whereby the guard is permanently but movably mounted to the fender, a fender having a wheel opening, a wheel guard to fit said opening, and means for movably fastening the wheel guard to said fender comprising a slotted fender bracket adapted to be placed at a lower corner of the fender adjacent the opening, said slot extending downward and toward the fender opening, an angle plate slidably bolted to said fender bracket, and a rod member mounted at one end to said angle plate and pivotable on a horizontal and vertical axis with respect thereto, and pivotally mounted on a vertical axis to said fender guard.

4. In the combination of a wheel guard and a vehicle fender of the type whereby the guard is permanently but movably mounted to the fender, a fender having a wheel opening, a wheel guard to fit said opening, and means for movably fastening the wheel guard to said fender comprising a slotted fender bracket adapted to be placed at a lower corner of the fender adjacent the opening, said slot extending downward and toward the fender opening, an angle plate slidably bolted to said fender bracket, means fastened substantially at one corner of said wheel guard for pivotally mounting the guard to said slidable angle plate, and spring clips mounted at the top of said guard and adapted to clamp said guard to said fender when said angle plate is shifted to the top of said fender bracket slot and said guard is in operative position.

RAY W. HARROUN.
EMERY K. ZIMMERMAN.